July 15, 1924.
C.G. McCLAY ET AL
MOTOR VEHICLE
Filed May 4, 1922     3 Sheets-Sheet 1
1,501,790
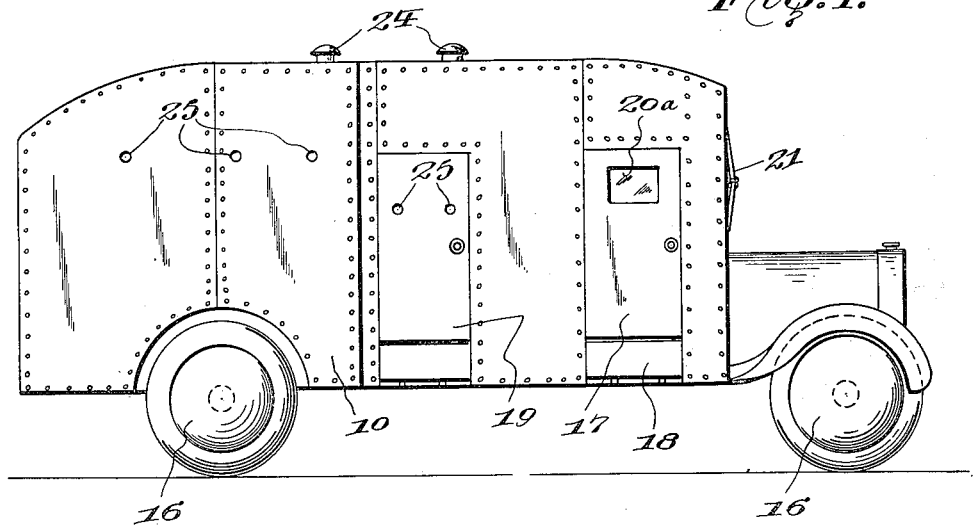
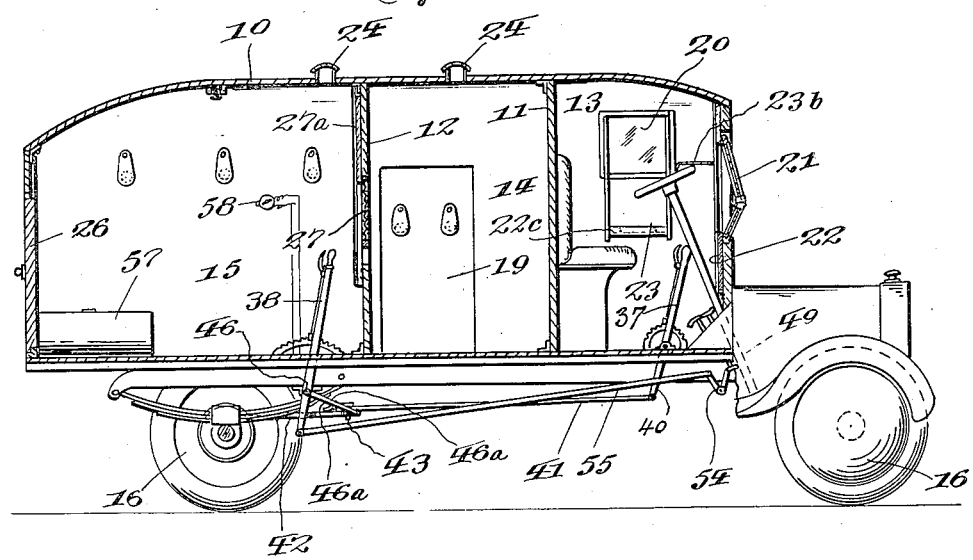
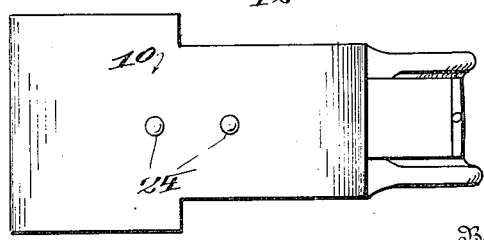

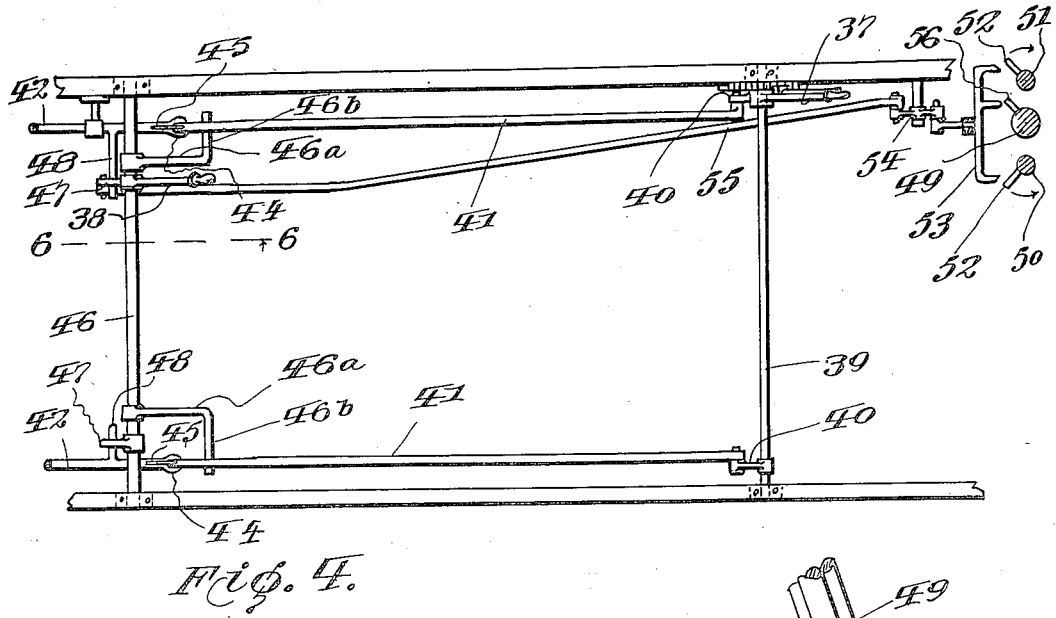
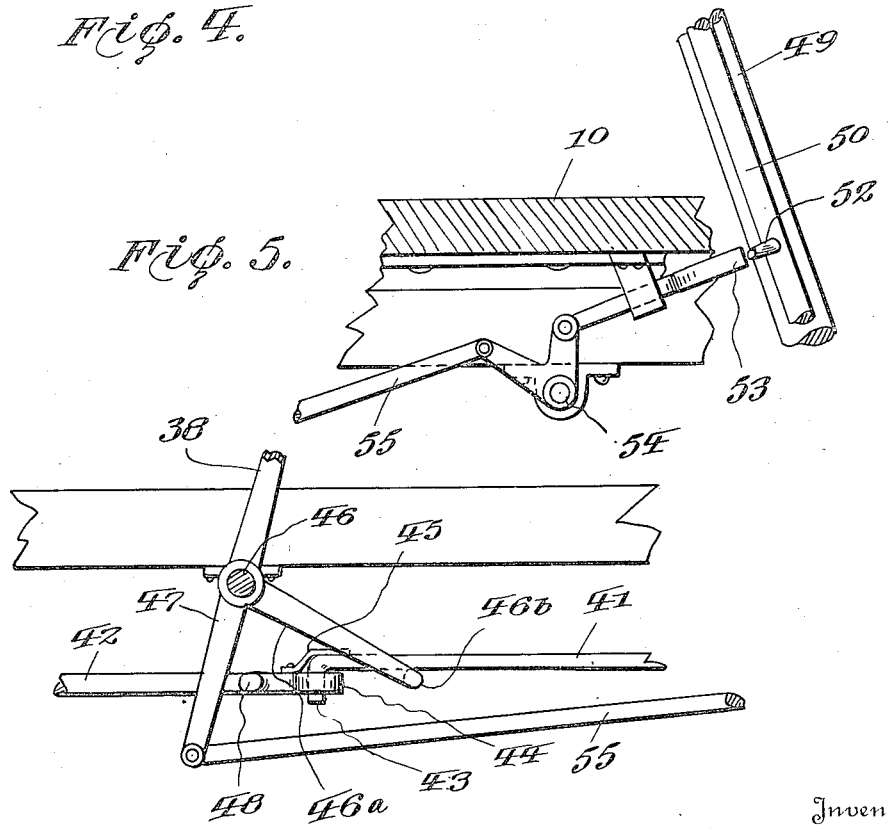

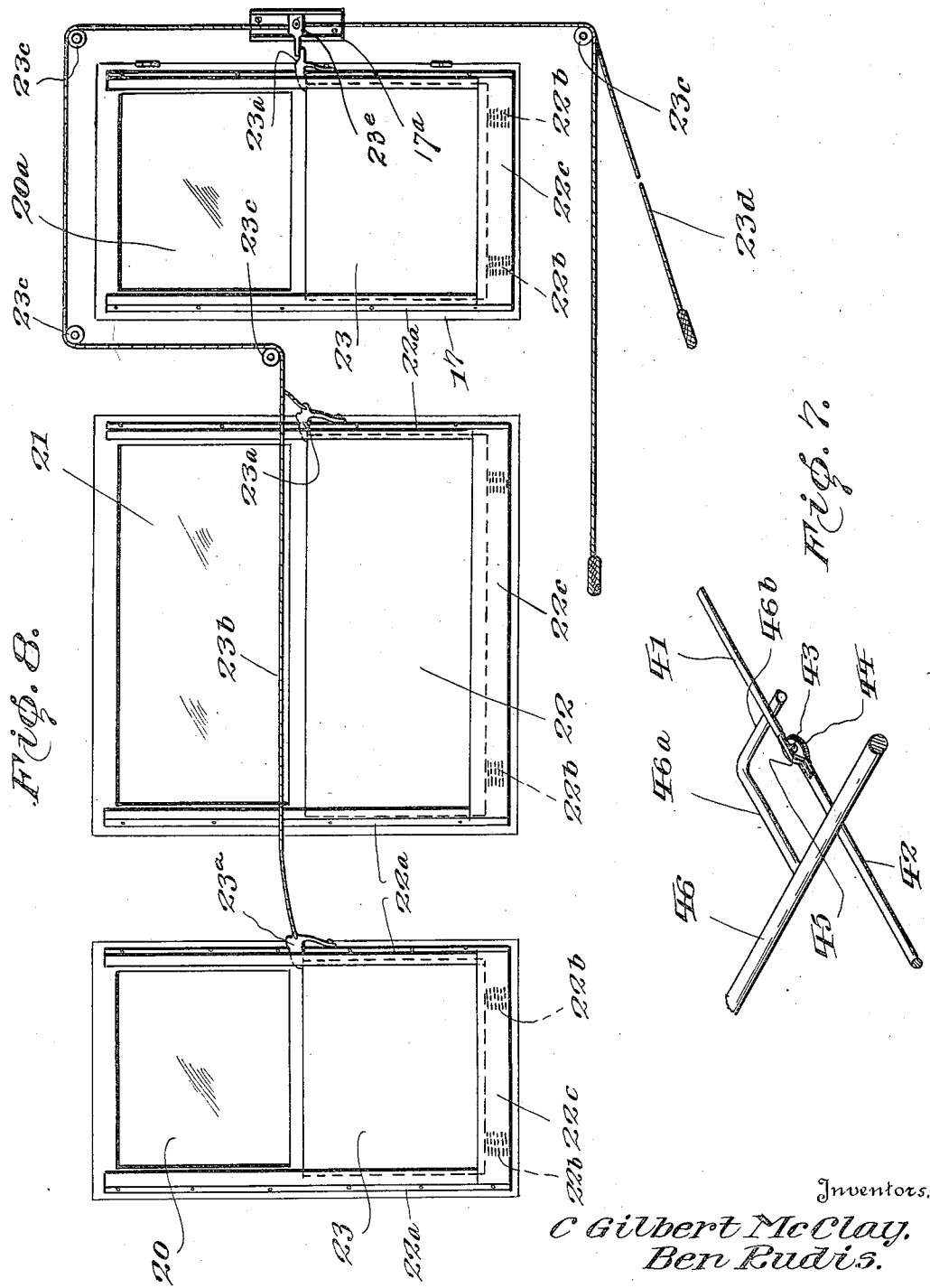

Patented July 15, 1924.

1,501,790

UNITED STATES PATENT OFFICE.

C. GILBERT McCLAY AND BEN RUDIS, OF CHICAGO, ILLINOIS.

MOTOR VEHICLE.

Application filed May 4, 1922. Serial No. 558,349.

*To all whom it may concern:*

Be it known that we, C. GILBERT McCLAY and BEN RUDIS, citizens of the United States, residing at Chicago, in the county of Cook and State of Illinois, have invented new and useful Improvements in Motor Vehicles, of which the following is a specification.

This invention relates to motor vehicles designed more particularly for transporting money, bonds, jewelry, merchandise and other valuables, and its object is to provide the same with various devices for protection against robbery as will be described in detail hereinafter.

In order that the invention may be better understood, reference is had to the accompanying drawings, wherein:

Figure 1 is a side elevation of the vehicle; Fig. 2 is a central longitudinal section of the vehicle body; Fig. 3 is a plan view thereof drawn to a reduced scale; Fig. 4 is a plan view of certain safety appliances; Fig. 5 is an elevation of a portion of such appliances; Fig. 6 is an enlarged section on the line 6—6 of Fig. 4; Fig. 7 is a perspective view of certain brake-controlling means, and Fig. 8 is a diagrammatic elevation of certain protection devices.

Referring specifically to the drawings, the body 10 of the car is divided by transverse partitions 11 and 12 into front, middle and rear compartments 13, 14 and 15, respectively, and the body, as well as the fenders and the hood, are rounded to make it difficult for bandits to climb thereon or to secure a foothold, and for the same reason the wheelhubs are capped smooth, as shown at 16. A side door 17 to the front compartment 13 closes flush and is minus handles on the outside. A foldable step 18 is operatively connected to the door 17 to swing down when said door is opened, and said step folds flush when the door is closed. The door 17 is on the right hand side of the car, and on each side of the compartment 14 is a door 19. The driver's exit is on the right side of his compartment, and the purpose of the left door of the compartment 14 is to enable one or more occupants of this compartment to leave the same from this side to aid the driver if he should be held up from the curb upon leaving the car.

The middle compartment 14 is for the transfer of valuables, and the rear compartment 15 is a vault. The driver's compartment 13 has a window 20 at the left, and the door 17 has a window 20$^a$. The driver's compartment also has the usual windshield 21, which latter is provided with a protective device consisting of a steel slide 22 movable to come behind the windshield. The side windows 20 and 20$^a$ are provided with similar slides 23 for protection of the occupants of the compartment 13. The body 10 also has top ventilators 24 and wicketed vision and gun openings 25.

The compartment 15 has a self-locking rear door 26 for access to said compartment when loading valuables thereinto, whereas the partition 12 has barred window 27 similar to that of a bank teller's cage, so that nothing larger than packets of valuables may pass.

A means is also provided for preventing the car from being run if the bandits should succeed in overpowering the driver. This is done by setting and locking the emergency brakes. The emergency brake lever is shown at 37 and an auxiliary brake lever at 38, the latter being located in the compartment 15. To the shaft 39 of the brake lever 37 are fastened two laterally extending arms 40 which are connected to the usual brake rods which extend to and are operatively connected to the brakes. In the present instance each brake rod is made in two longitudinally alined and detachably connected sections 41 and 42, the former having a downturned rear end forming a coupling pin 43 adapted to seat in an eye 44 in the forward end of the section 42. A flat spring 45 carried by the section 42 and engaging the rear end of the section 41 holds the coupling pin 43 seated in the eye 44. The shaft 46 of the auxiliary lever 38 has one or more laterally extending arms 46$^a$ having their forward ends bent sidewise, as shown at 46$^b$ and positioned beneath the rear end of the rod sections 41, and similar arms 47 extending rearwardly to engage lateral arms 48 on the brake rod sections 42. When the lever 38 is swung in the proper direction, the arms 46$^b$ lift the rod sections 41 to uncouple the same from the rod sections 42, which disables or disconnects the lever 37 from the brake mechanism, and at the same time, the brakes are set by the engagement of the arms 47 with the lateral arms 48 of the rear rod sections 42. As the regular brake lever 37 is now disabled, the brakes cannot be released by said lever. The brake controlling means hereinbefore described can be modified in various ways according to the particular arrangement of the levers and other parts constituting the brake actuator assembly.

In order to further prevent the car from being operated if the bandits should succeed in getting access to the driver's compartment 13, a mechanism has been provided for disabling the spark and throttle control, as well as the steering gear, this mechanism being also under the control of the occupants of the rear compartment 15, and being composed of the following parts:

Alongside the steering post 49 are located the rotatable throttle and commutator rods 50 and 51. These rods have laterally extending arms 52. When the throttle is closed and the spark lever is operated to fully retard the spark, the arms 52 swing in the direction of the arrows shown in Fig. 4, and hence by providing a pusher to engage these arms, the throttle can be closed and the spark retarded to make starting of the car practically impossible. This pusher can be a yoke 53 having its branches opposite the arms 52. The yoke is pivoted to one of the frame members of the car as shown at 54, and it is connected by a rod 55 to the lever 38 so that when the latter is operated as hereinbefore described, the yoke is also operated. The yoke 53 has a third branch which is engageable with a laterally extending arm 56 on the steering post 49 to rotate the latter and thus set the steering wheels of the car for making a turn.

Fig. 3 shows the shape of car body 10 when viewed from the top. It will be noted that the rear portion is wider than the front portion so that the forwardly facing projecting sides of the rear portion may be fitted with sight openings to enable the person in the rear compartment to observe what goes on in front of the car and act accordingly. Various other changes and modifications in the structural details hereinbefore described may also be made without a departure from the spirit and scope of the invention as claimed hereinafter.

Figure 8 illustrates, diagrammatically the means for controlling the projecting slides 22 and 23 for the windshield 21 and the windows 20 and 20$^a$. Each slide seats at its side edges in guides 22$^a$, and at the bottom on coiled springs 22$^b$ housed in a pocket 22$^c$. Each slide is normally in lowered position, and so held against the tension of the springs by a latch 23$^a$ engageable over the top edge of the slide. When the latches are released the springs force the slides upwardly to cover the window and the windshield. The latches of the three slides are operated simultaneously by a line or cable 23$^b$ passing over suitably located guide pulleys 23$^c$ and into the compartment 13, with a branch 23$^d$ going to the vault or rear compartment 15 so that the occupant of the latter may release the slides in case he detects danger unsuspected by the driver. The window 27 is also provided with a protective slide 27$^a$.

As the window 20$^a$ is on the door 17, the latch 23$^a$ which holds the slide 23 of this window down has a side lug engageable by a slide block 23$^e$ to which the line 23$^b$ is connected. This construction provides an operating means for the latch which does not interfere with the swing of the door. The slide block 23$^e$ works in guides 17$^a$.

In the compartment 15 is located the fuel tank 57 and a master electric switch 58 so that the fuel and the ignition may be shut off when danger is seen.

We claim:

1. A motor vehicle having its body provided with a driver's compartment and a separate compartment to the rear thereof, a steering mechanism controllable from the driver's compartment, and means operable from the rear compartment for disabling the steering mechanism.

2. A motor vehicle having its body provided with a driver's compartment and a separate compartment to the rear thereof, a throttle and spark control mechanism operable from the driver's compartment, and means operable from the rear compartment for actuating said mechanism to close the throttle and retard the spark.

3. A motor vehicle having its body provided with a driver's compartment and a separate compartment to the rear thereof, a steering mechanism having a member which swings when said mechanism is operated, and a locking means engageable with said member and operable from the rear compartment.

4. A motor vehicle having its body provided with a driver's compartment and a separate compartment to the rear thereof, a brake mechanism including a brake lever, and rods actuated by said lever, said rods being in sections, a coupling device for said sections, means in the rear compartment for operating the coupling device, and an operative connection between said means and one of the rod sections.

5. A motor vehicle having its body provided with a driver's compartment and a separate compartment to the rear thereof, a throttle and spark control mechanism including rotatable members having laterally extending arms, said mechanism being operable from the driver's compartment, a yoke movable to engage the arms for actuating the mechanism, and actuating means for the yoke located in the rear compartment.

In testimony whereof we affix our signatures.

C. GILBERT McCLAY.
BEN RUDIS.